United States Patent
Stephenson et al.

(10) Patent No.: US 10,082,187 B2
(45) Date of Patent: Sep. 25, 2018

(54) MECHANICALLY ROUGHENED BRAKE ROTORS

(71) Applicant: FORD MOTOR COMPANY, Dearborn, MI (US)

(72) Inventors: David Alan Stephenson, Detroit, MI (US); James Maurice Boileau, Novi, MI (US); Timothy J. Potter, Dearborn, MI (US); David Garrett Coffman, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/578,763

(22) Filed: Dec. 22, 2014

(65) Prior Publication Data

US 2016/0178019 A1    Jun. 23, 2016

(51) Int. Cl.
| | |
|---|---|
| F16D 65/12 | (2006.01) |
| B23B 27/06 | (2006.01) |
| B23B 5/02 | (2006.01) |
| F16D 65/02 | (2006.01) |

(52) U.S. Cl.
CPC ............. *F16D 65/127* (2013.01); *B23B 5/02* (2013.01); *B23B 27/06* (2013.01); *F16D 65/125* (2013.01); *B23B 2235/045* (2013.01); *F16D 2065/132* (2013.01); *F16D 2065/1304* (2013.01); *F16D 2250/0038* (2013.01)

(58) Field of Classification Search
CPC ...... F16D 65/12; F16D 65/125; F16D 65/126; F16D 65/127; F16D 2065/132; F16D 2065/1304
See application file for complete search history.

(56) References Cited

U.S. PATENT DOCUMENTS

| | | | | |
|---|---|---|---|---|
| 2,255,024 | A * | 9/1941 | Eksergian | F16D 65/124 188/218 XL |
| 4,156,479 | A * | 5/1979 | Kawamura | F16D 65/127 188/218 A |
| 5,407,035 | A | 4/1995 | Cole et al. | |
| 5,474,161 | A * | 12/1995 | Eaton, III | F16D 65/127 188/218 XL |
| 5,664,648 | A | 9/1997 | Hester | |
| 5,806,636 | A | 9/1998 | Atmur et al. | |
| 6,290,032 | B1 * | 9/2001 | Patrick | C23C 4/08 188/218 XL |
| 7,219,777 | B2 | 5/2007 | Lin | |
| 7,220,458 | B2 * | 5/2007 | Hollis | C23C 4/02 427/248.1 |
| 7,261,192 | B2 * | 8/2007 | Khambekar | F16D 65/127 188/218 XL |
| 7,682,667 | B2 | 3/2010 | Imaizumi et al. | |
| 2002/0153213 | A1 * | 10/2002 | Gruber | C04B 35/573 188/218 XL |
| 2008/0119117 | A1 | 5/2008 | Nichols | |

(Continued)

FOREIGN PATENT DOCUMENTS

EP    0 537 987 A1    4/1993

*Primary Examiner* — Nicholas J Lane
(74) *Attorney, Agent, or Firm* — Brooks Kushman P.C.

(57) ABSTRACT

A brake rotor includes an outer surface; first and second opposing braking surfaces, each bounded by the outer surface to form first and second opposing braking surface edges. A plurality of concentric grooves are formed on the first and/or second braking surfaces.

16 Claims, 5 Drawing Sheets

(56) References Cited

U.S. PATENT DOCUMENTS

| | | | | |
|---|---|---|---|---|
| 2011/0056777 A1* | 3/2011 | Woychowski | .......... | F16D 65/12 |
| | | | | 188/218 XL |
| 2012/0058363 A1* | 3/2012 | Verpoort | .................. | C23C 4/08 |
| | | | | 428/649 |
| 2013/0333989 A1* | 12/2013 | Oezer | ................... | F16D 65/127 |
| | | | | 188/218 XL |
| 2014/0000996 A1* | 1/2014 | Schoepf | ............... | F16D 65/127 |
| | | | | 188/218 XL |
| 2014/0262642 A1* | 9/2014 | Schluck | ............... | F16D 65/127 |
| | | | | 188/218 XL |
| 2015/0082850 A1* | 3/2015 | Flores | ..................... | B24B 7/00 |
| | | | | 72/252.5 |

\* cited by examiner

MECHANICALLY ROUGHENED BRAKE ROTORS

TECHNICAL FIELD

The invention is directed to a mechanically roughened brake rotor, tool and process to make the same.

BACKGROUND

Automotive disc brakes consist of a rotor and a caliper. The rotor rotates with the wheel and axle. The caliper does not rotate and holds the brake pads. The caliper is mounted over and on either side of the rotor. When the brake is actuated, the caliper forces the pads against the rotor to dissipate energy and stop the car. The rotor, subject to high stress and heating, has traditionally been made of cast iron, which is a relatively heavy material. There has been considerable interest in developing rotors made out of relatively light weight materials such as aluminum and magnesium, in an effort to reduce vehicle weight and increase fuel economy. Such relatively lightweight metal rotors are coated with a hard surface layer for proper friction as well as wear and resistance. This hard layer can be applied by several processes, for example by thermal spraying a metal powder or wire onto the surface of the rotor.

SUMMARY

A mechanically roughened surface of a brake rotor is disclosed. The rotor includes an outer surface; first and second opposing braking surfaces, each bounded by the outer surface to form first and second opposing braking surface edges; and a plurality of concentric grooves included on the first braking surface. Each of the plurality of concentric groove may have a substantially constant diameter. The plurality of concentric grooves may include first and second concentric grooves. The first groove may be closer to the first braking surface edge than the second groove, and the first groove may have a larger substantially constant diameter than the second groove. The first and second grooves may be adjacent to each other and form a peak extending therebetween. In one or more embodiments, a width of each peak may be 100 to 200 μm. The first and second grooves each may include a groove depth and a valley width. The groove depth of each of the first and second grooves may be 50 to 100 μm. The valley width of each of the first and second grooves may be 200 to 300 μm. The plurality of concentric grooves may be included on a portion of the first braking surface. The brake rotor may further comprise a plurality of concentric grooves included on the second braking surface. The plurality of concentric grooves on the second braking surface may include first and second concentric grooves, and the first groove may be closer to the first braking surface edge than the second groove, and the first groove may have a larger substantially constant diameter than the second groove.

A method of mechanically roughening surface of thermally sprayed brake rotors is disclosed. The method includes rotating a brake rotor having first and second opposing braking surfaces, actuating a tool to roughen the first braking surface of the brake rotor to form a plurality of concentric grooves in the first braking surface of the brake rotor. The method may further include the step of simultaneously actuating a first and second tool to roughen the first and second braking surfaces of the brake rotor to form a plurality of concentric grooves on the first and second braking surfaces. The method may include simultaneously actuating a first and second tool to roughen the first and second braking surfaces of the brake rotor to form a plurality of concentric grooves on the first and second braking surfaces. The first and second tool are stationary during the actuating step. The method may further include deforming the plurality of concentric grooves on the first braking surface to form a plurality of deformed concentric grooves. In one or more embodiments, the method may include a step of applying a coating to the concentric grooves of the first braking surface.

A cutting tool for mechanical roughening of a brake rotor surface is disclosed. The cutting tool may include a body having a cutting surface; and one or more rows of cutting elements projecting outwardly from the cutting surface, each cutting element of each row including one or more groove cutting elements and one or more pocket cutting elements, each groove cutting element including one or more groove cutting teeth and each pocket cutting element having a cutting surface. The groove cutting teeth may be substantially equally spaced apart from each other in a first row. Additional groove cutting teeth may be equally spaced apart in a second row, the second row being parallel to the first row, and the groove cutting teeth in the second row may be aligned with the pocket cutting elements of the first row.

DETAILED DESCRIPTION

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Automotive disc brakes include a rotor which is subject to high stress and wear. Since traditionally used cast iron rotors may be too heavy for modern automotive constructions, rotors from relatively light weight materials, such as aluminum and magnesium, have been proposed. Such relatively light weight metal rotors are coated with a hard surface layer for proper friction as well as wear and resistance. This hard layer can be applied by several processes, for example thermal spraying a metal powder or wire onto the surface of the rotor. The rotor surface is prepared to retain this hard, thermally-sprayed metal layer.

Various methods of surface preparation are known, but these methods have a number of disadvantages. One of the methods is grit blasting, which has a number of drawbacks, including grit fracturing, contamination, variability of results over time, generation of a substantial amount of waste, and compromised environmental air quality. Other known methods of rotor roughening include Nissan mechanical roughening process, HP Waterjet, and the Braunschweig process. An additional process was developed by Honsel and Gühring in 2008. The Honsel process feeds a roughening tool radially from the outside and cuts one tooth at a time, which results in a substantial amount of time to complete the roughening operation. Additionally, it is not possible to provide roughening of both sides of a brake rotor at once or roughen the rotor inside or outside as the tool moves in a spiraling direction.

Therefore, it would be desirable to provide a method for surface preparation of brake rotors to be thermally sprayed without these drawbacks. It would be even more desirable to provide a mechanical roughening process for brake rotors which would be repeatable with the substantially same result, which would be fast, cost effective, precise, and which would allow repeated roughening and roughening of both sides at the same time.

According to one or more embodiments, the rotor surface may be prepared by roughening the rotor surface by machining a series of concentric grooves in the surface. The machined grooves can be used without further processing, but to further increase adhesive strength, the grooves may be deformed for increased bond strength. Embodiments disclosed herein provide roughening tool and processes for roughening the surface of a brake rotor, to enhance the adhesion and bonding of subsequently applied metal powder or wire.

Figure 1:
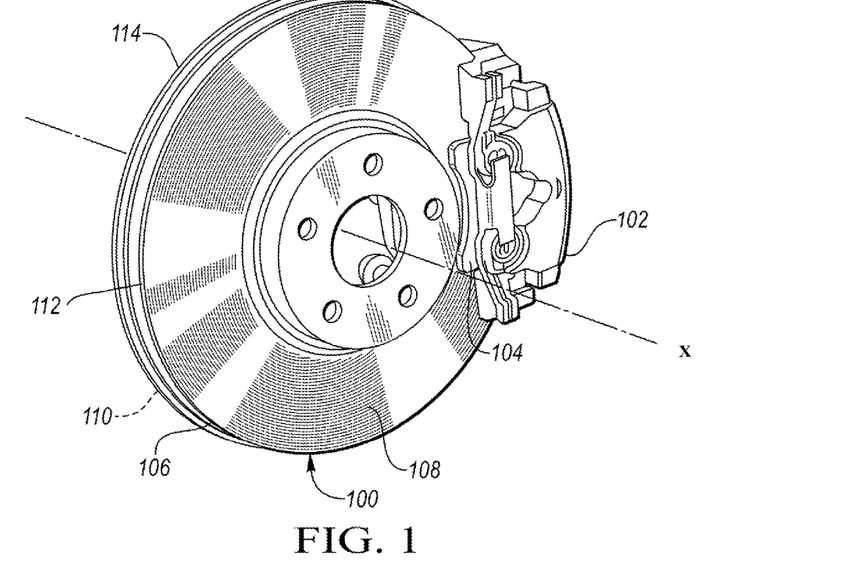
FIG. 1 depicts a perspective view of a treated brake rotor in accordance with one embodiment.

FIG. 1 depicts a non-limiting example of a brake rotor 100 and a nonrotating caliper 102 holding the brake pads 104. The rotor has an outer surface 106, a first braking surface 108, and a second braking surface 110. The first and second braking surface 108 and/or 110 may be roughened by methods disclosed herein. The mechanical roughening method can be used on the first braking surface 108, the second braking surface 110, or both. The first braking surface 108 and the second braking surface 110 are each bounded by the outer surface 106 to form a first braking surface edge 112 and a second braking surface edge 114.

The mechanical roughening can be performed on the entire first braking surface 108, the entire second braking surface 110, or on a portion of the first and/or second braking surface 108, 110. For example, an edge 112 or 114 on a first and/or second braking surfaces 108, 110 may not be subjected to roughening to eliminate edge chipping by providing a protective lip 116. An exemplary protective lip 116 can be seen in FIG. 3B.

Figure 2A:
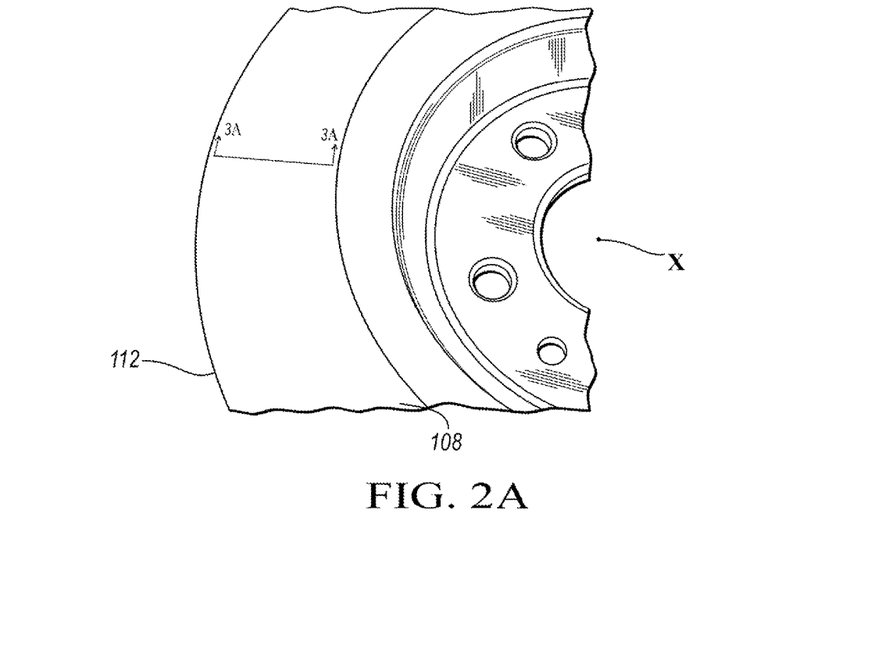
FIG. 2A depicts a fragmented, perspective view of a brake rotor surface before surface roughening.
Figure 2B:
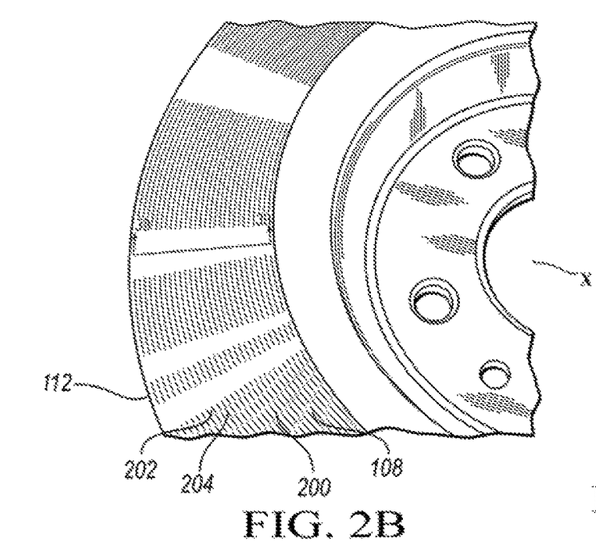
FIG. 2B depicts a fragmented, perspective view of a brake rotor surface having concentric circles formed thereon.

Prior to the roughening process, the first and the second braking surfaces 108, 100 are relatively smooth surfaces without any ridges or grooves, as shown in FIG. 2A. During the roughening process, a plurality of grooves 200 is machined into the first and or second braking surfaces 108, 110. As can be seen in FIG. 2B, the grooves 200 are concentric, having a substantially constant diameter. The concentric grooves 200 have a common center and a common axis x which the rotor 100 rotates around.

The plurality of grooves 200 includes at least a first concentric groove 202 and a second concentric groove 204. FIG. 2B depicts concentric grooves 202 formed on a first surface 108 surface of the brake rotor 100 according to the method of the teachings herein. As can be seen in FIG. 2B, the first concentric groove 202 is closer to the first braking surface edge 112 than the second concentric groove 204. The first concentric groove 202 has a larger substantially constant diameter than the second groove 206.

The plurality of concentric grooves 200 are adjacent to each other. The first and second concentric grooves 202, 204 form a peak 206 extending between the concentric grooves 202, 204. As shown in FIG. 3B, a plurality of peaks 206 is formed between the plurality of concentric grooves 200. The peaks 206 may have any size, shape, configuration thereof to sufficiently activate the braking surface 108, 110. The peaks 206 may have a shape of a rectangle, square, mushroom, dove-tail, the like, or a combination thereof before/and or after deformation. The peaks 206 may be deformed to create an overhang 216 which is designed to lock down coating which may be subsequently applied to the braking surfaces 108, 110. The peaks 206 have a peak length before deformation 208, as depicted in FIG. 3C. The peak length before deformation 208 of all the peaks 206 may be substantially the same. The peak length before deformation 208 and/or the peak length after deformation 218 of the peaks 206 may be from 5 to 500 μm, more preferably 50 to 250 μm, most preferably 100 to 200 μm. Any other peak lengths 208 and 218 are contemplated. The peak length before deformation 208 may differ from peak length after deformation 218 or the peak lengths 208 and 218 may be substantially the same. The difference between peak length 208 and peak length 218 is defined by lengths L1 and L2 as illustrated in FIG. 3C.

Figure 3A:
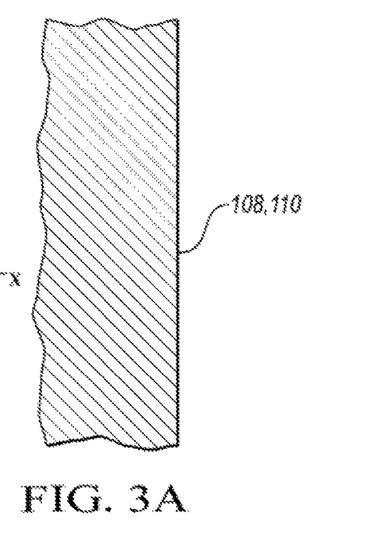
FIG. 3A depicts a fragmented, cross section view taken along line 3A-3A of FIG. 2A of the rotor surface before roughening.
Figure 3B:
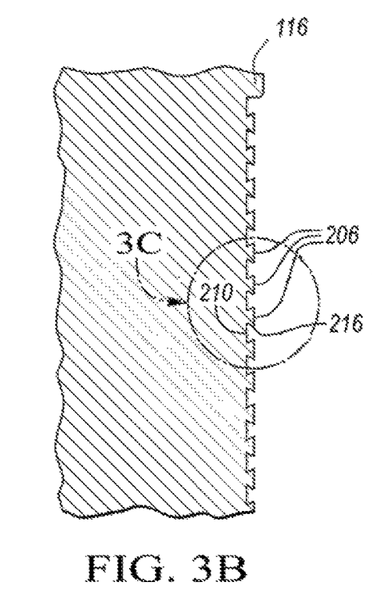
FIG. 3B depicts a fragmented, cross section view taken along line 3B-3B of FIG. 2B of the rotor surface which has been machined to produce a recessed surface with concentric grooves.
Figure 3C:
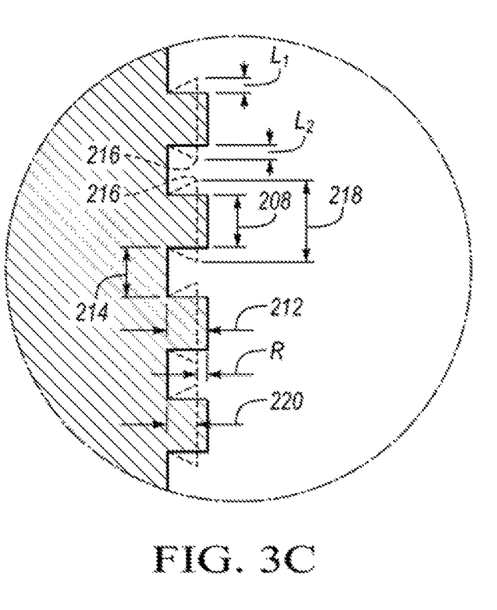
FIG. 3C depicts a magnified, schematic view of FIG. 3B of concentric grooves before and after deformation in accordance with one embodiment.

A cross section of a first and/or second braking surfaces 108, 110 before roughening can be seen in FIG. 3A. A cross section of a surface 108, 110 prepared by roughening method disclosed herein to include a plurality of concentric grooves 200 is shown in FIGS. 3B and 3C.

As is illustrated in FIGS. 3B and 3C, a valley 210 is formed between adjacent peaks 206. A valley 210 is defined by a groove depth before deformation 212 or a groove depth after deformation 220 and a valley width 214, as is illustrated in FIG. 3C which is a magnified schematic view of the cross section of the braking surfaces 108, 110 from FIG. 3B. A groove depth before deformation 212 and/or a groove depth after deformation 220 is a distance from the top of the peak 206 to the bottom of the valley 210. The groove depth before deformation 212 and/or groove depth after deformation 220 may be from 5 to 500 μm, more preferably 25 to 250 μm, most preferably 50 to 100 μm. Any other groove depths 212 and 220 are contemplated. The groove depth before deformation 212 may differ from groove depth after deformation 220 or the groove depths 212 and 220 may be substantially the same. The difference between the groove depth before deformation 212 and groove depth after deformation 220 is defined by distance R as illustrated in FIG. 3C. A valley width 214 is a distance between two adjacent peaks 206. The valley width 214 may be 50 to 500 μm, more preferably 100 to 400 μm, most preferably 200 to 300 μm. Any other valley width 214 is contemplated. A valley width before deformation may be substantially the same or different from a valley width after deformation.

Figure 4:
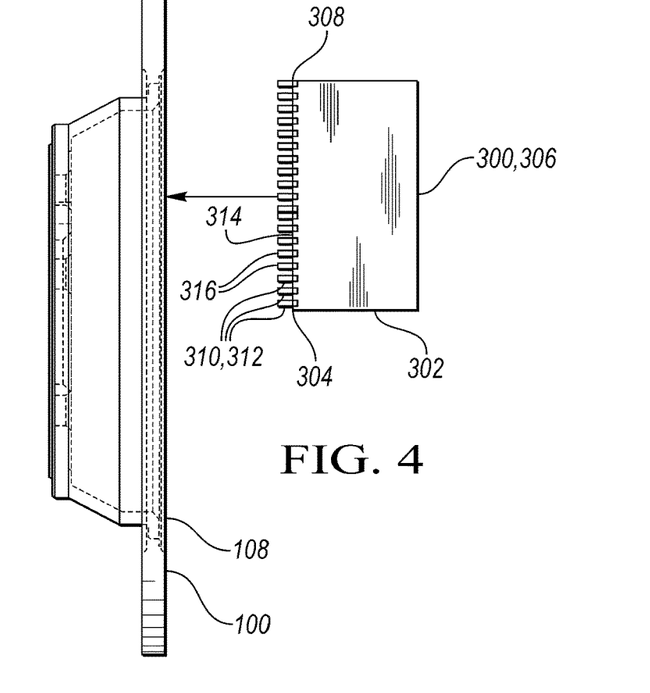
FIG. 4 illustrates a schematic, side view of a brake rotor and a tool block with inserts to produce a recessed surface on the brake rotor in accordance with one embodiment.

Referring now to FIG. 4, a tool 300 used in the roughening process as disclosed herein is depicted. The tool 300 comprises a body 302 having a cutting surface 304. As depicted in FIG. 4, the tool 300 may comprise a tool block 306 and one or more inserts 308. The insert 308 include cutting surface 304. The cutting surface 304 includes one or more rows of cutting elements 310. The cutting elements 310 are projecting outwardly from the cutting surface 304. The cutting elements 310 may include groove cutting elements 312, peak forming elements 314, pocket cutting elements, the like, or a combination thereof. The cutting elements 310 include one or more cutting teeth 316. The peak forming elements 314 include a cutting surface 318. Referring to FIG. 4, the insert 308 comprises the cutting surface 304 with cutting elements 310. FIG. 4 further schematically illustrates that the cutting surface 304 includes a number of teeth 316. It should be understood that the number of teeth 316 shown is simply exemplary. The cutting teeth 316 may be rectangular in shape, although other shapes, e.g., square, are contemplated by one or more embodiments. All of the cutting teeth 316 may have the same size and shape. Alternatively, at least some of the cutting teeth 316 may have a different size and shape than the rest of the cutting teeth 316.

The tool 300 may include one or more rows of the cutting teeth 316. The cutting teeth 316 may be configured in a variety of patterns. Preferably, the tool 300 may include one row of cutting elements 310. The tool 300 may have cutting elements 310 configured in a square wave form. The preferable wavelength is 0.4 mm, but other lengths are contemplated. Even more preferably, the cutting teeth 316 may be horizontally aligned in a single row across the face of the tool 300. In an alternative embodiment, the cutting teeth 316 may be configured in two rows in a zig zag pattern to increase the strength of the tool 300 and reduce chance of the tool 300 breaking. In another alternative embodiment, the cutting teeth 316 may be configured in two rows with half width teeth to cut the concentric grooves 200 in two separate passes. A single row of cutting teeth 316 may be configured as one piece formed from precision ground material such as solid tungsten carbide with brazed diamond edges. In yet another embodiment, the cutting teeth 316 may be configured in at least two sections, each section covering less than the entire length of the tool 300. The at least two sections may be mounted together for cost savings and to minimize damage in case of a crash of the machine 400.

The tool 300 as described above may be a part of another machine 400, for example a lathe. The lathe may be any type of lathe. Preferably, the machine 400 is a horizontal bed facing lathe for single sided roughening and a double turret lathe for double-sided roughening process.

Figure 5:
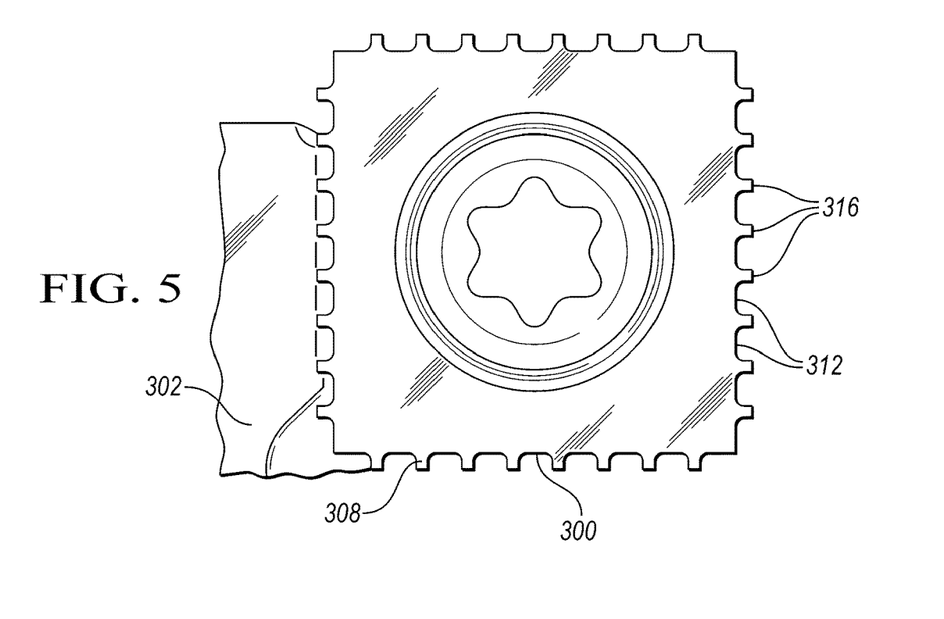
FIG. 5 shows a schematic, top view of an insert used to roughen surface of the brake rotors in accordance with one embodiment.

An exemplary tool 300 may be seen in FIG. 5. The insert 308 of FIG. 5 includes cutting teeth 316 on four sides. Each side includes a plurality of rows of cutting teeth 316. The groove cutting teeth 316 form valleys 210 on the first and/or second braking surface 108, 110. The distance between the groove cutting teeth 316 defines peak forming elements 314. Preferably, the groove cutting teeth 316 are equally spaced apart so that the valley width 214 and the peak length 208 are uniform. For example, the groove cutting teeth 316 may be equally spaced apart in a first row and at least a second row, the second row being parallel to the first row.

The cutting elements 310 may include a chamfer to provide stress relief and ease of mounting of the cutting elements 310. The cutting elements 310 are made out of a durable material, preferably a hard metal such as replaceable brazed polycrystalline diamond. In other embodiments, replaceable tungsten carbide elements may be used. The dimensions of the groove cutting teeth 316 and peak forming elements 314 correspond to the desired dimensions of grooves 200 and peaks 206 to be formed on the first and/or second braking surfaces 108, 110. In an exemplary embodiment, a width of the tool's section including cutting elements 310 may be equal to the radial width of the roughened area on the rotor 100, for example 60 to 100 mm. Any other width is contemplated. The number of cutting teeth 316 depends on the width of the rotor flange 120 to be roughened. For example, a rotor flange 120 which is 800 mm wide may require a tool 300 with 200 concentric groove cutting teeth 316.

The tool 300 may be actuated mechanically, hydraulically, pneumatically, electromechanically, the like, or a combination thereof. Preferably, the tool 300 is actuated against a hard stop, even more preferably, the tool 300 has a spring loaded retraction.

The present disclosure further provides a method of roughening the first and/or second braking surfaces 108, 110. The mechanical roughening process includes the following steps, which may be conducted in any order or repeated as is desirable. The following steps disclose roughening of the first braking surface 108 only. The incoming rotor 100 should have a hub bored and squared, the profile should be rough machined, and flanges equalized. Loading a rotor 100 onto a machine 400, such as a lathe. Preferably, the lathe is a horizontal bed facing lathe. Locating the rotor 100 on a rotor bore and face plate surface. Loading the rotor 100 on the machine 400, radially and axially toward the facing plate surface 402 to seat the rotor 100. Performing one or more facing cuts to true the rotor 100 to the facing plate surface 402. Rotating the rotor 100 around the axis x. Feeding a tool block 306 to cut a plurality of grooves 200 in a first braking surface 108. Feeding the tool block 306 to cut recessed pocket for selective area coating. Performing roughening of the entire area of the first braking surface 108. Performing roughening of a part of the first braking surface 108. Roughening a selected area of the first braking surface 108. Cutting a plurality of concentric grooves 200 in at least a portion of the first braking surface 108. Forming a plurality of peaks 206. Pressing the tool block 306 against the first braking surface 108. Pressing the plurality of concentric grooves 200 in the first braking surface 108. Creating all of the concentric grooves 200 in the first braking surface 108 at the same time. Creating all of the concentric grooves 200 in the first braking surface 108 in one press. Retracting the tool block 306 to a fixed point. Deforming the plurality of concentric grooves 200 on the first braking surface 108 to form a plurality of deformed concentric grooves 200. Applying a coating to the concentric grooves 200 of the first braking surface 108. Unclamping the rotor 100. Unloading the rotor 100.

Figure 6:
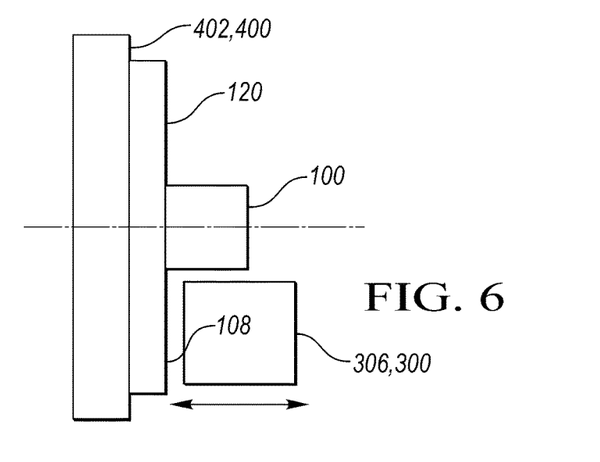
FIG. 6 illustrates a schematic, side view of a single-sided method of roughening brake rotor surface in accordance with one embodiment.

The single-sided method is depicted in FIG. 6. A rotor 100 with its rotor flange 120 is loaded onto the machine 400 to face the facing place 402 of the machine 400. The tool block 306 is pressed against the first braking surface 108. A plurality of cutting elements 310, such as best seen in FIGS. 4 and 5, cut a plurality of concentric grooves 200 and form a plurality of peaks 206 between the grooves. One of the advantages of the single-sided method lies in the rigid setup which is dynamically stable. Dimensions and location of the blade can be easily controlled.

The following steps disclose simultaneous roughening of the first and second braking surfaces 108, 110. The incoming rotor 100 must have its hub bored and square and profile rough machined. Rough machining may be done in during the roughening process. The mechanically roughening process includes the following steps, which may be conducted in any order or repeated as is desirable. Locating the rotor 100 on the machine 400, such as a horizontal bed double turret lathe. Loading the rotor 100 radially and axially toward a fixed stop on mandrel 404. Performing two or more-sided facing cuts to true and equalize the rotor 100 and control dimensions for roughening. Performing roughening operation. Feeding tool blocks 306 from opposing sides to fixed depths to cut a plurality of concentric grooves 200 and form a plurality of peaks 206. Roughening a portion of the first and/or second braking surfaces 108, 110. Roughening a selected area of the first and/or second braking surfaces 108, 110. Pressing concentric grooves into the first braking surface 108 and the second braking surface 110 at the same time. Simultaneously actuating a first and second tool 300 to roughen the first and second braking surfaces 108, 110 to form a plurality of concentric grooves 200 on the first and second braking surfaces 108, 110. Simultaneously actuating a first and second tool 300 to roughen the first and second braking surfaces 108, 110 to form a plurality of concentric grooves 200 on the first and second braking surfaces 108, 110 while the first and second tool 300 is stationary during the actuating step. Retracting one or more tool blocks 306 to a fixed point. Deforming the plurality of concentric grooves 200 on the first and/or second braking surfaces 108, 110 to form a plurality of deformed concentric grooves 200. Feeding wiper bars from opposing sides to fixed stops to deform the plurality of grooves 200. Feeding a wiper bar to a fixed stop to deform the plurality of grooves 200. Applying a coating to the concentric grooves 200 of the first and/or second braking surfaces 108, 110. Unclamping the rotor 100. Unloading the rotor 100.

Figure 7:
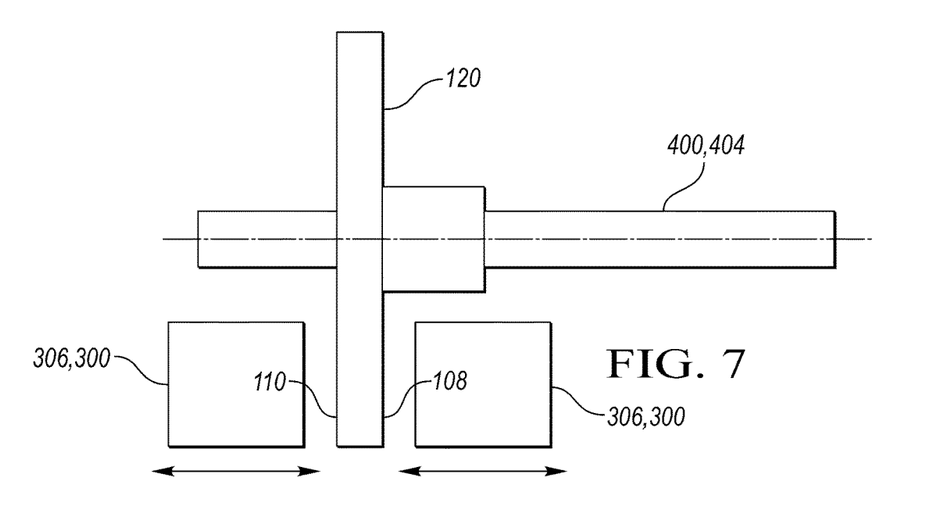
FIG. 7 illustrates a schematic, side view of a double-sided method of roughening brake rotor surface in accordance with one embodiment.

The double-sided roughening is depicted in FIG. 7. The rotor 100 is loaded onto a mandrel 404 as was described above. One tool block 306 is pressed against the first braking surface 108 and a second tool block 306 is pressed against the second braking surface 110. Both tool blocks 306 are axially fed and retracted at the same time. One of the advantages of the double-sided roughening method lies in reduced number of steps if both sides of a rotor 100 are to be roughened.

The roughening process may be repeated, for example, the tool 300 may be offset from the original roughening position. The roughening process may be repeated to overlap the previous set of grooves 200 on the first braking surface 108. The roughening process may be also performed by cutting half width of grooves 200 and the tool 300 later radially offset to cut the remaining half of the grooves 200 to increase cost savings.

Figure 8:
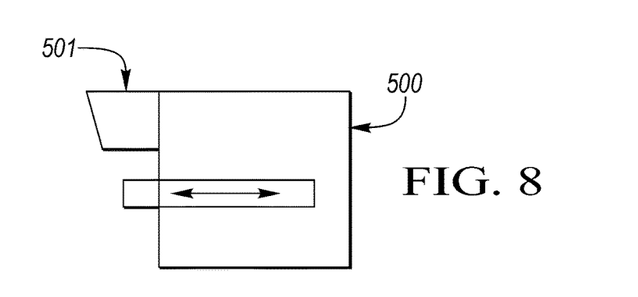
FIG. 8 depicts a detailed schematic view of a deforming blade used to flatten peaks of the recessed surface of a brake rotor roughened according to one embodiment.

As was discussed above, the groove pattern may be deformed to create an overhang 216. The overhang 216 is designed to lock down a coating subsequently applied. The overhang 216 is illustrated in FIGS. 3B and 3C. The peak length after deformation 218 and the groove depth after deformation 220 are illustrated in FIG. 3C. The overhang 216 may be formed by pressing on the tops of the groove peaks 206. To deform the grooves 200 into a desired shape, swiping may be done with a spindle in reverse to form a dovetail form on the grooves 200. Preferable swipe depth may be 5 to 50 µm, preferably 10 to 30 µm. Optional deformation from wiper may be 3 µm, preferably 6 µm. Alternatively, the peaks 206 may be flattened using a deforming blade 500 having cutting teeth 501, which is activated against a positive stop. A schematic view of the deforming blade 500 with cutting teeth 501 is depicted in FIG. 8.

Figure 9:
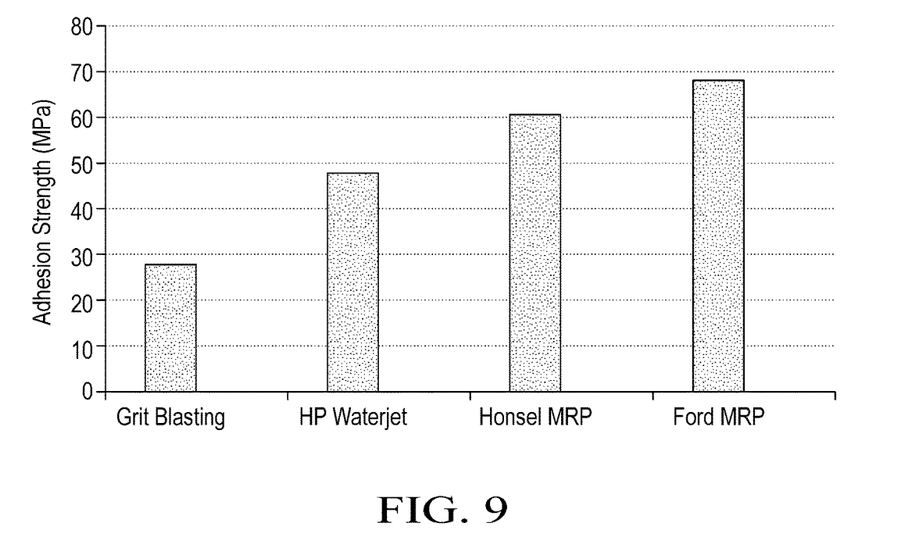
FIG. 9 depicts a graph of adhesion test results for the mechanical roughening process of one embodiment in comparison to other roughening processes.

Referring now to FIG. 9, the adhesion test results for the mechanical roughening process of the present disclosure in comparison to other roughening processes are disclosed. As can be seen, the Ford mechanical roughening process (MRP) results in better surface adhesion than other mechanical surface processes such as grit blasting, Honsel process, and HP Waterjet. Mechanical roughening as currently disclosed thus provides a higher adhesive bond strength between the rotor surface and the thermally-sprayed surface layer.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake rotor comprising:
   opposing braking surfaces bounded an outer surface to form braking surface edges;
   concentric grooves on the braking surfaces forming peaks defining groove overhangs; and
   a protective lip, adjacent to a groove surface and a first braking surface edge, including
   a planar surface extending parallel to and planarly offset from the peaks, and
   a planar sidewall extending orthogonally from the groove surface to a height greater than heights of the peaks.

2. The brake rotor of claim 1, wherein each of the concentric grooves has a substantially constant diameter.

3. The brake rotor of claim 1, wherein the concentric grooves are a plurality of concentric grooves that includes a first and second concentric grooves adjacent to each other and forming a peak extending therebetween, the first groove having a larger substantially constant diameter than the second groove, and the first groove is closer to the first braking surface edge than the second groove.

4. The brake rotor of claim 3, wherein a width of each peak is 100 to 200 µm.

5. The brake rotor of claim 3, wherein the first and second grooves each include a groove depth and a valley width.

6. The brake rotor of claim 5, wherein the groove depth of each of the first and second grooves is 50 to 150 µm.

7. The brake rotor of claim 5, wherein the valley width of each of the first and second grooves is 200 to 300 µm.

8. The brake rotor of claim 1, wherein the planar surface is free of mechanical roughening.

9. The brake rotor of claim 1, further comprising a plurality of concentric grooves included on both a first braking surface and a second braking surface opposite the first braking surface.

10. The brake rotor of claim 1, wherein the brake rotor is made from aluminum or magnesium.

11. A brake rotor comprising:
an outer surface;
first and second opposing braking surfaces, each bounded by the outer surface to form first and second opposing braking surface edges;
a plurality of concentric grooves included on the first and second braking surfaces and forming a plurality of peaks between adjacent groove surfaces, each peak having a first height and each groove surface having a second height, and a groove sidewall extending between each peak and adjacent groove surface at an acute angle relative to the groove surface such that a portion of each peak defines an overhang that extends over an adjacent groove surface; and
a pair of protective lips, each protective lip immediately adjacent to the first or second braking surface edge and to a groove surface, each protective lip having a generally flat surface extending parallel to the peaks at a third height, wherein the third height is greater than the first height that is greater than the second height, wherein each protective lip has a planar sidewall that extends orthogonally from an adjacent groove surface such that the planar sidewall is disposed in non-parallel orientation relative to the groove sidewall, and wherein the planar sidewall extends orthogonally from the adjacent groove surface to a height greater than the first height.

12. The brake rotor of claim 11, wherein the protective lip comprises a protective lip surface being a portion of the first braking surface.

13. The brake rotor of claim 11, wherein the protective lip is free of mechanical roughening across the width.

14. A brake rotor comprising:
an outer surface;
first and second opposing braking surfaces, each bounded by the outer surface to form first and second opposing braking surface edges;
a plurality of concentric grooves, each having a groove included on the first braking surface and forming a plurality of peaks therebetween, wherein a groove sidewall extends between a peak and an adjacent groove surface at an acute angle relative to the groove surface such that a portion of the peak defines an overhang that extends over the adjacent groove surface; and
a protective lip having a flat protective lip surface adjacent to the first braking surface edge and to the groove surface, wherein the flat protective lip surface extends parallel to and planarly offset from the peaks, wherein the protective lip has a planar sidewall that extends orthogonally from the adjacent groove surface such that the planar sidewall is disposed in non-parallel orientation relative to the groove sidewall, and wherein the planar sidewall extends orthogonally from the adjacent groove surface to a height greater than heights of the peaks.

15. The brake rotor of claim 14, wherein the protective lip surface is a portion of the first braking surface.

16. The brake rotor of claim 14, wherein the entire protective lip surface is free of mechanical roughening.

* * * * *